Oct. 3, 1967 W. L. HACK ET AL 3,344,498
METHOD OF JOINING TUBULAR CONDUITS TO
LIGHTWEIGHT BULKHEAD PANELS
Filed Aug. 23, 1962 3 Sheets-Sheet 1

INVENTORS
WILLIAM L. HACK
JOHN A. STEIN
RODERICK G. ROHRBERG

ATTORNEY

Oct. 3, 1967   W. L. HACK ET AL   3,344,498
METHOD OF JOINING TUBULAR CONDUITS TO
LIGHTWEIGHT BULKHEAD PANELS
Filed Aug. 23, 1962   3 Sheets-Sheet 2
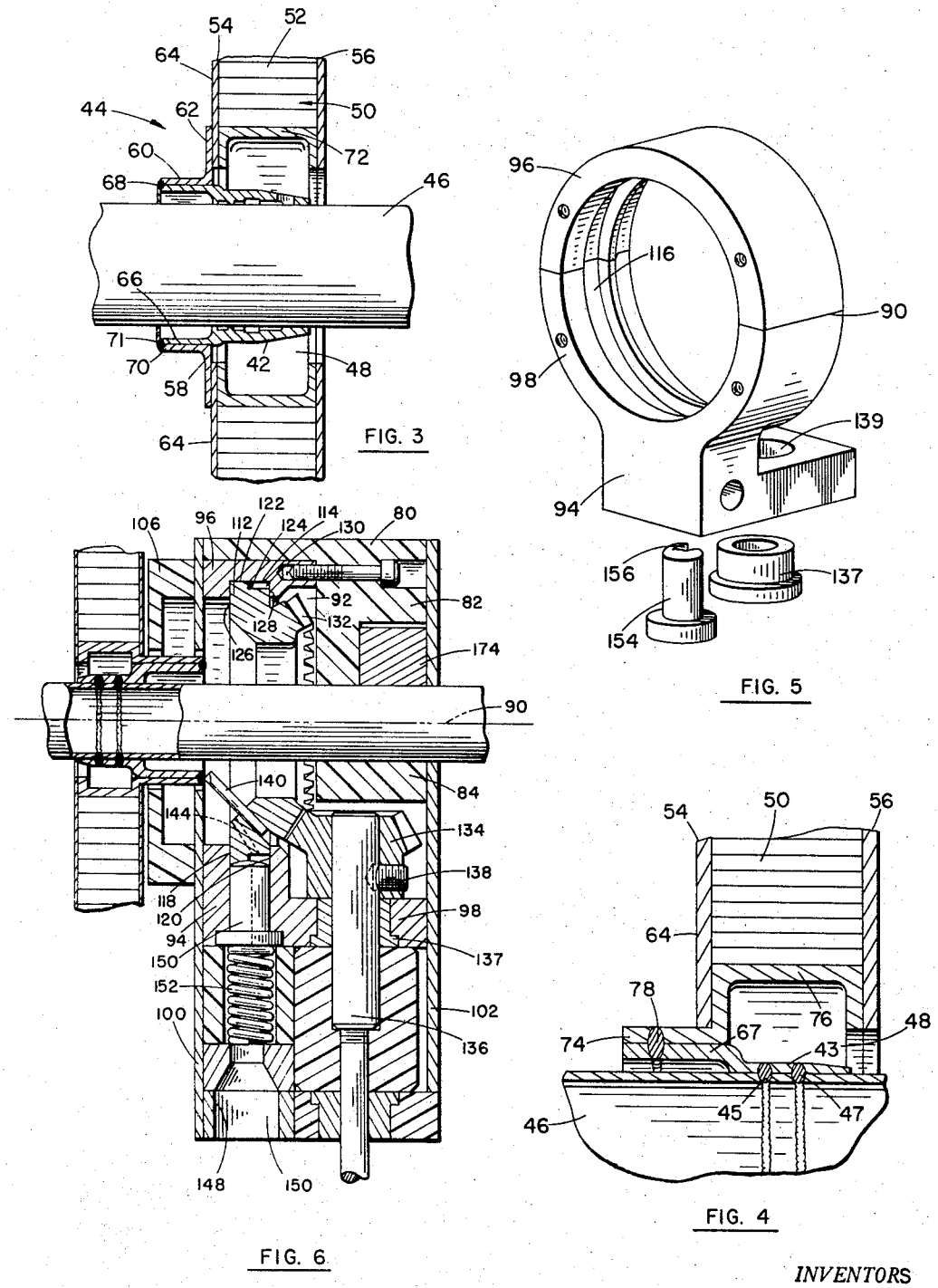
INVENTORS
WILLIAM L. HACK
JOHN A. STEIN
RODERICK G. ROHRBERG
ATTORNEY

INVENTORS
WILLIAM L. HACK
JOHN A. STEIN
RODERICK G. ROHRBERG

ATTORNEY

United States Patent Office 3,344,498
Patented Oct. 3, 1967

3,344,498
METHOD OF JOINING TUBULAR CONDUITS TO LIGHTWEIGHT BULKHEAD PANELS
William L. Hack, Los Angeles, John A. Stein, Torrance, and Roderick G. Rohrberg, Inglewood, Calif., assignors to North American Aviation, Inc.,
Filed Aug. 23, 1962, Ser. No. 218,924
6 Claims. (Cl. 29—157.4)

ABSTRACT OF THE DISCLOSURE

The disclosure is of a method for joining tubular conduits to lightweight bulkhead panels in aerial vehicles. The joint is formed by securing a flanged collar on the conduit, securing a flanged ring on the panel where the conduit penetrates through the panel, and finally securing the collar and ring together by application of welding heat to the stated flanges. Application of heat may occur simultaneously to both flanges to burn down the same, at a location spaced apart from both the conduit and the panel, thereby avoiding damage to either from the welding heat.

---

Figure 1:
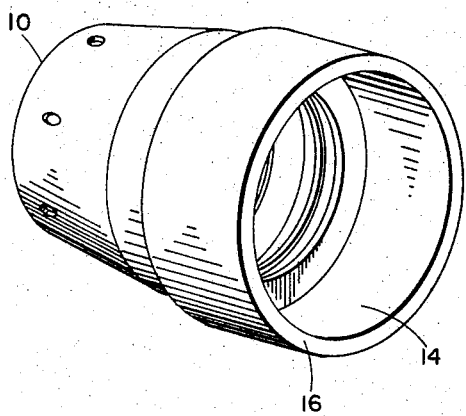

This invention relates to an improved type of welded joint as well as method and apparatus for welding such joint. More particularly, the invention concerns improved method and means for fusion welding along a circumferential path to form welded joints between conduits or the like and operatively related structure situated external relative thereto, by compact, portable and lightweight apparatus such as required for in-place welding of small workpieces in crowded installations.

Although the invention in this case is applicable to conduit connections or supports having many different forms and serving diverse purposes, it will be described for the sake of illustration in connection with conduits used in high speed aerial or orbital vehicles. It will be understood that the scope of the inventive concept is not limited by the specific details used to explain the invention, except as determined by the claims in this case.

In fabricating vehicles of the stated type, efficient use of all available space is essential due to the extremely complex and crowded internal structures characterizing such vehicles. Fluid or electrical lines or conduits in such vehicles are frequently fabricated in separate sections of complex shape or form as required to route them through compartments and bulkheads and connect them to each other. Adjacent ends of connecting lines or conduits must be accurately aligned and secured to each other by means which provide great strength as well as adequate sealing to prevent leakage. Where lines or conduits must pass through bulkheads or panels within the vehicle, structural connections between such bulkheads and lines to support the latter are required to withstand the severe vibration and structural deflections occurring during operation of the vehicle. Moreover, where conduits pass through panels comprising the walls of pressurized compartments, fuel cells, or the like, the fitting between the panel and conduit is required to provide adequate sealing to prevent leakage through the panel at the location of such fitting.

Due to the extremes of pressure, external loading and temperature associated with operation of vehicles of the stated type, new materials of construction formerly unknown in conventional supersonic aircraft are required. Notable among such materials are the so-called advanced alloys of precipitation hardenable stainless steel for which the alloy designated as PH15-7Mo stainless steel is illustrative. The component elements and their general range of percentage composition by weight for PH15-7Mo stainless steel are as follows:

| | | |
|---|---|---|
| Carbon | percent maximum | .09 |
| Manganese | do | 1.00 |
| Phosphorous | do | .04 |
| Sulphur | do | .03 |
| Silicon | do | 1.00 |
| Chromium | percent | 14.00 to 16.00 |
| Nickel | do | 6.5 to 7.5 |
| Molybdenum | do | 2.00 to 3.00 |
| Aluminum | do | .75 to 1.5 |
| Iron | | Balance |

The stated materials, including PH15-7Mo steel, in the hardened state are characterized by a reduction in strength when heated excessively, and by other adverse effects resulting from welding thereof. Thus, for example, the application of welding heat to precipitation hardened steel in the martensitic state causes annealing and consequent weakening of the material in the zone of fusion and in the base metal closely adjacent thereto. To avoid difficulties resulting from application of welding heat, structural supports and connections involving the stated materials are frequently accomplished by brazing instead of welding. However, since the amount of heat required to melt brazing alloys suitable for use with precipitation hardenable stainless steel is considerably higher than the annealing temperature of such steel, weakening of the brazed structure often results, in the absence of simultaneously cooling of the brazed structure during the brazing operation. Use of devices or methods to accomplish such cooling during in-place welding or brazing is normally prevented by extremely crowded internal conditions typical of modern aerial and space vehicles.

Accordingly, it is a principal object of this invention to provide an improved welded joint for connection of structure with conduits or the like having particular sensitivity to the application of welding heat wherein such joint is welded in-place.

It is a further object of this invention to provide an improved welded joint between tubular conduits or the like and elements structurally related thereto without requiring direct application of welding heat to such conduits or elements in welding such joint.

It is a further object in this case to provide improved conduit connection and union characterized by superior strength and performance reliability.

It is another object of this invention to provide an improved structural supporting connection between conduits or the like and panels through which such conduits penetrate.

It is an additional object in this case to provide an improved welded joint and method of welding as set forth in these objects which are capable of practice in crowded equipment areas characterized by severely limited working space around the stated joint.

It is also an object in this case to provide apparatus for accomplishing the joint described in the above objects.

Figure 2:
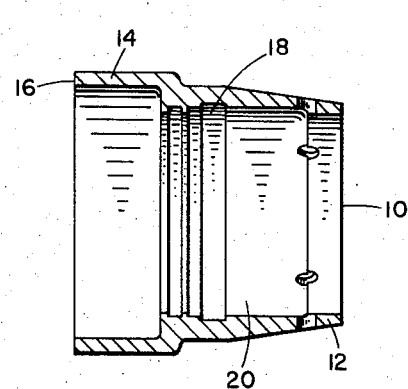
Figure 2A:
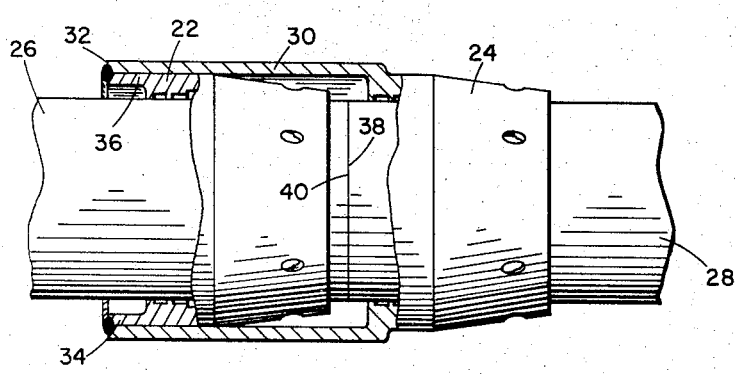

Other objects and advantages of the instant invention will become apparent upon a close reading of the following detailed description of an illustrative embodiment of the inventive concept, reference being had to the accompanying drawings, wherein:

FIGURE 1 shows a perspective view of a ferrule adapted for use according to the inventive principles taught herein, FIGURE 2 shows a cross-sectional view taken along an imaginary plane diametrally through the center of the ferrule shown in FIGURE 1, FIGURE 2a is a cross-sectional view taken on a vertical plane through the center of a conduit coupling or union

Figure 7:
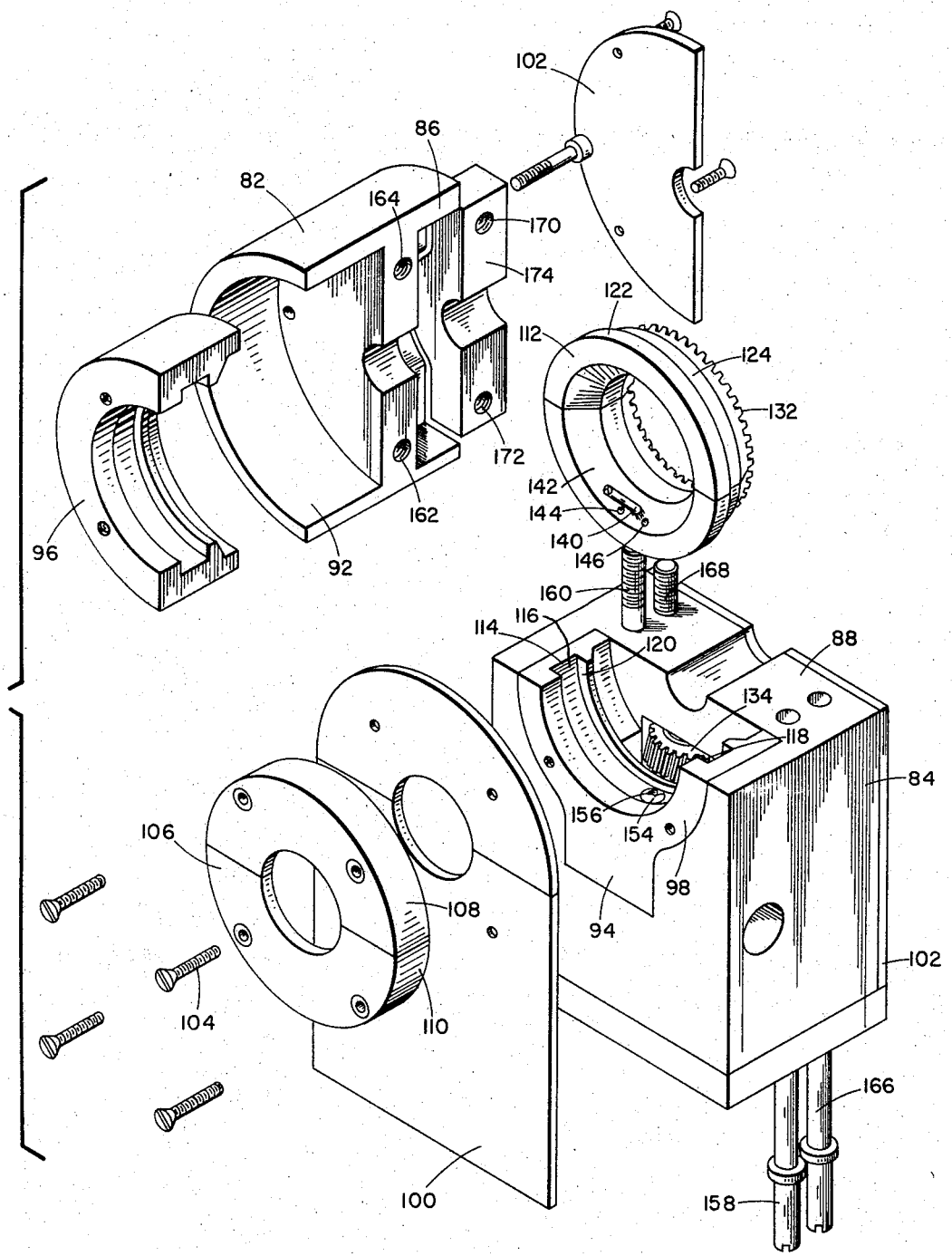

3 incorporating the structure shown in FIGURES 1 and 2,

FIGURE 3 shows a side elevational view, partly in cross-section, through a bulkhead support fitting formed according to the inventive principles taught herein, FIGURE 4 is an isolated view in cross-section, showing a modification of the structural arrangement shown in FIGURE 3, FIGURE 5 is an isolated view in perspective of a portion of the apparatus shown in FIGURES 6 and 7, FIGURE 6 is a cross-sectional view taken through the center of an illustrative embodiment of apparatus for performing welding as required to make the joint indicated by reference numeral 71 in FIGURE 3, for example, and FIGURE 7 is an exploded view in perspective of the apparatus of FIGURE 6.

Referring to the drawings described above and particularly to FIGURES 1 and 2, it may be seen that the inventive concept disclosed herein includes intermediate connection means in the form of a ferrule or annular collar 10 having a bearing portion 12 and a flange portion 14 terminating in a distal edge 16 having a thickness which may be substantially less than that of bearing portion 12. Bearing portion 12, which is adapted to contact a tube, conduit, or the like may be provided with one or more grooves or annular cavities such as reference numerals 18 and 20 to accommodate brazing alloys when attachment of ferrule 10 to the stated tube or conduit is accomplished by brazing. However, it will be understood that the scope of the inventive concept in this case is not limited to the use of brazed attachment between ferrule 10 and the stated conduit or the like. Thus, where threaded connection, shrink-fitting, or welding is preferred in place of brazing, for example, grooves 18 and 20 may be replaced by threads or omitted entirely.

An example of a conduit coupling illustratively incorporating a pair of ferrules 22 and 24 generally similar to ferrule 10 described above and secured to conduits 26 and 28 is shown by FIGURE 2a. In forming the joint shown by FIGURE 2a, ferrules 22 and 24 may be separately brazed, welded or otherwise secured to conduits 26 and 28, respectively, using bench or laboratory equipment prior to being permanently joined in the system of which the conduits may form a part. It may be seen from the stated figure that ferrule 22 is sized to fit within flange portion 30 of ferrule 24 and proximate thereto whereby distal edge 32 of flange portion 30 is substantially even and coplanar with distal edge 34 on flange portion 36 of ferrule 22 when the abutting ends 38 and 40 of conduits 26 and 28, respectively, are in substantially uniform circumferential contact. With the component parts of the coupling connection shown by FIGURE 2a in the stated relationship and operatively related to the system within which conduits 26 and 28 form a part, in-place welding or brazing between flange portions 30 and 36 may be accomplished to join the same together. Welding may be accomplished either by simultaneously applying welding heat to distal edges 32 and 34, or by applying heat to the outer surface of flange 30 and burning through the material therein to fuse the same to flange 36. However, the simultaneous burn-down welding of flanges 30 and 36 by application of welding heat to distal edges 32 and 34 is preferable because separation of conduits 26 and 28 may be effected by removal of the weld bead, after which rejoinder of the conduits may be accomplished by burn-down welding of the same flanges.

Referring to FIGURE 3, use of a ferrule or collar 42 generally similar in form to ferrule 10 described above and shown in FIGURES 1 and 2 may be seen incorporated in a bulkhead connection or support generally designated by reference numeral 44. As seen from FIGURE 3, ferrule 42 may be preplaced on any elongate member such as a tube, conduit, or the like as indicated by reference numeral 46 and secured thereto by suitable means such as welding, brazing, shrink-fitting, roll swag-

4 ing, or other permanent attaching method. This step may be accomplished using bench methods and equipment permitting a joint having superior strength and reliability between ferrule 42 and elongate tube or conduit 46, after which the stated components may be situated within the frame or vehicle and held in the position corresponding with its desired final relationship with surrounding structure during the ensuing installation steps. Thus, in the illustrative example of FIGURE 3, conduit 46 is positioned within an aperture or opening 48 in a bulkhead or panel generally designated by numeral 50, through which the conduit is required to pass.

In the example shown by FIGURE 3, panel 50 illustratively comprises a panel of sandwich type construction having low-density core material 52 of substantially uniform thickness with relatively higher density face sheets 54 and 56 permanently joined to the core material on either side thereof by bonding, brazing or the like. Panel and bulkhead material of the type illustrated by panel 50 and used extensively in modern supersonic aerial and orbital vehicles typically comprises advanced alloy stainless steels of thin-walled construction characterized by extreme sensitivity to the application of heat. Where such panels are required to be pierced by elongate members such as tubes, lines, conduits, or the like which derive their support from structural attachment to the panels or bulkheads thus penetrated, avoidance of the direct application of welding heat on such panels is of paramount importance to prevent the weakening and distortion effects which otherwise would result from such heat. The novel arrangement of parts shown in FIGURE 3 avoids application of welding heat directly upon panel 50 by providing aperture 48 with a mounting ring 58 comprising a flange portion 60 and a base portion 62. As shown by FIGURE 3 base portion 62 of ring 58 is initially secured to a surface 64 of face sheet 54 by suitable means such as clamping, bonding, brazing, or the like, as a result of which mounting ring 58 is permanently secured to panel 50 in the desired position of alignment with respect to aperture 48 in the stated panel. Thereafter, tube or conduit 46 having ferrule 42 previously joined thereto at the predetermined required location is positioned in desired final relationship within aperture 48 and with respect to panel 50. In the stated relationship, annular substantially cylindrical flange portion 66 of ferrule 42 is sized to fit within annular flange portion 60 of mounting ring 58 and is substantially uniform circumferential surface area contact therewith as shown by FIGURE 3. Also, where joinder of flanges 60 and 66 is accomplished by a burn-down weld, distal edges 68 and 70 of flange portions 60 and 66, respectively, are required to be in substantially the same plane and proximate each other whereby the application of welding heat to edges 68 and 70 simultaneously will fuse the material forming an annular weld bead joining flanges 60 and 66 to each other. It may be seen from FIGURE 3 that the structural arrangement illustratively shown therein includes a ring-shaped closeout or annular channel member 72 having a size and form adapted to fit within aperture 48 and between face sheets 54 and 56 of panel 50 whereby closeout member 72 provides increased strength in panel 50 around aperture 48. It will be understood that the size and function of panel 50, considered with such factors as operating stresses and temperatures associated with its function, will determine the form or desirability of providing closeout members such as indicated by reference numeral 72 in FIGURE 3, and the scope of the inventive concept disclosed herein is not limited to any particular panel or aperture configuration. Thus, for example, closeout member 72 could conceivably be omitted from the structural arrangement shown by FIGURE 3 without altering the inventive subject matter otherwise evidenced by the stated figure.

FIGURE 4 shows a modified arrangement of the structure shown in FIGURE 3 and discussed above wherein mounting ring 58 is eliminated and its function is served by a flange portion which may be integrally formed on an insert or closeout member 76 corresponding otherwise in form and function with closeout member 72 discussed above. Thus, flange portion 74 is of annular shape and protrudes outwardly from surface 64 of face sheet 54 of panel 50 as shown by FIGURE 4. Flange portion 74 may be united to flange portion 67 of ferrule 43 by a weld joining the distal edges of flanges 67 and 74 in the manner shown and described in connection with weld bead 71 in FIGURE 3. However, an alternative type of weld which may advantageously be used instead of that shown in FIGURE 3, for example, is also shown in FIGURE 4. Thus, weld bead 78 may be generally characterized as a burn-through weld between flange portions 67 and 74 produced by application of welding heat from a heat source located externally with respect to flange 74 whereby welding heat is transmitted through the material in flange 74 and thence into the material in flange 67. Apparatus for accomplishing such a weld is disclosed in copending U.S. patent application Ser. No. 183,891 filed on Mar. 30, 1962 now U.S. Patent No. 3,194,936, issued July 13, 1965. It will be understood that the burn-through type weld such as illustratively shown in FIGURE 4 may be substituted in place of the burn-down weld shown, for example, in FIGURES 2a and 3 without departing from the scope of the inventive concept in this case insofar as the novel tubular or conduit connections in FIGURES 1–4 are concerned. Also, the burn-through welding apparatus mentioned above may be used to join collar or ferrules 42 or 43 to conduit 46 instead of the brazed connection shown in FIGURES 2a and 3, for example, as illustrated by the two burn-through weld beads 45 and 47 in FIGURE 4.

Referring to FIGURES 5, 6, and 7, an illustrative embodiment of apparatus adapted to perform burn-down welding as required to form annular weld bead 71 between flange distal edges 68 and 70 in FIGURE 3, for example, is shown. In FIGURES 6 and 7, it may be seen that the novel apparatus in this case includes a dielectric housing or body portion 80, comprising an upper portion 82 and a lower portion 84 having surfaces 86 and 88, respectively, adapted to contact in operative relationship around portions 60 and 66 of workpiece components 42 and 58, for example, along a plane of separation 90. Housing 80 is provided with a cavity 92 within which a stationary bearing element or mount 94, shown more particularly by FIGURE 5, is adapted to fit. Mount 94 is split along plane of separation 90 forming upper portion 96 and lower portion 98. A pair of metallic end plates 100 and 102 are secured to either side of housing 80 by suitable means such as mounting screws 104, each plate being divided along common plane of separation 90. Mounting screws 104 are adapted to hold a gas shield 106, similarly divided in the manner described above and forming portions 108 and 110 shown in FIGURE 7, for example.

Considering FIGURE 6, it may be seen that rotatable welding means in the form of substantially circular welding ring 112 is adapted to fit in relatively movable bearing contact within bearing element or mount 94. Thus, mount 94 is provided with an annular groove or recess 114 best seen in FIGURE 7 and comprising a circumferential bearing surface 116 and two parallel planar radially extending side surfaces 118 and 120. Welding ring 112 is provided with two circumferential surfaces 122 and 124 on the outer periphery thereof and radially spaced apart as shown more particularly in FIGURE 6. Parallel planar radially extending surfaces 126 and 128 adjoin circumferential surfaces 122 and 124 in the manner also visible from FIGURE 6. Thus, with the parts assembled in operative relationship, it may be seen that continuous circumferential contact occurs between surfaces 118 and 126, between surfaces 120 and 128, and between surfaces 114 and 122 whereby continuous and accurate alignment of welding ring 112 is maintained during rotation of the ring relative to stationary mount 94. Moreover, it may be seen from FIGURE 6 that surface 124 of ring 112, being inwardly spaced from surface 114 of mount 94 cooperates therewith to provide an annular chamber 130 between the assembled parts of a purpose described below.

Welding ring 112 is also provided with force transmitting means in the form of annular bevel gear 132 also contained within cavity 92 and operatively engaged with bevel pinion 134 which, together with drive shaft 136 to which the pinion may be appropriately affixed as by set screw 138, forms driving means for causing rotation of welding ring 112 by suitable drive or motor means (not shown) suitably connected with drive shaft 136. A bushing 137 of high wear resistant material is contained in a hole 139 provided in mount 94 for rotatably supporting drive shaft 136.

Welding ring 112 is further provided with welding means in the form of electrode 140 affixed to the ring and rotatable therewith. Beveled surface 142 from which electrode 140 extends is further provided with one or more holes or passages as indicated by reference numerals 144 and 146 in FIGURE 7, for example, communicating with chamber 130. The welding tool shown by FIGURES 5, 6, and 7 also incorporates means for supplying electrical power and inerting gas as required for welding by electrode 140. The stated means includes hollow conductive bushing 148 secured at the base of dielectric housing 80. The inner walls of bushing 148 are adapted to contact a suitable external connection element (not shown) and to receive electrical current and inerting gas therefrom. The stated current then passes from bushing 148 through contacting compression coil spring 152 into brush 154, also of conductive material, which is maintained in continuous contact with peripheral surface 122 by spring 152 during rotation of ring 112. Inerting gas received within receptacle 150 is connected through the center of coil spring 152 into a passage 156 formed within hollow brush 154 and thence into annular chamber 130 through passages 144 and 146, escaping around electrode 140 and filling cavity 92. Gas shield 106 comprises wall means forming a further portion of the gas-filled area during welding, and serves to enclose a generous portion of the workpiece material to insure that the weld area will be free from oxidizing effects during welding.

*Operation*

Although the apparatus shown in FIGURES 5, 6, and 7 and discussed above may be used for the application of heat to a variety of diverse materials and workpieces, and for different purposes, its operation need not in any case differ materially from that described below for the sake of illustration. Prior to use of the apparatus for welding the conduit connections shown in FIGURES 2a, 3, or 4, the workpiece components to be joined must first be positioned in the desired final relationship. Thus, the joint suggested by FIGURE 3 requires concentric alignment of flanges 60 and 66 in substantially uniform continuous circumferential contact with each other about a common axial center through aperture 48 and conduit 46, and with flanges 60 and 66 positioned so that their distal edges are substantially in a common plane.

With the workpiece components properly arranged as described, the two halves of welding ring 112 may be positioned in operative relationship with the stated components and the two halves of dielectric housing 80, with the components secured thereto, may be positioned around ring 112 with surface 122 properly contained within annular groove or recess 114. Placement of the parts in the stated relationship will be facilitated by operative engagement of the threaded ends of two throughbolts 158 and 160 shown in FIGURE 7, in threaded holes 162 and 164, respectively, with which portion 82 of housing 80 is provided. Rotation of the stated throughbolts pulls the separate portions of ring 112 and housing 80, with parts connected thereto, into close engagement around the workpiece components on either side of plane of separation 90. Thereafter, another pair of throughbolts 166 and 168 engaging holes 170 and 172 on either side of independent tube clamp element 174 may be rotated to pull element 174 into firm clamping relationship with the tubular component of the workpiece to be welded.

Upon completion of the assembly procedures described above, appropriate electrical and inert gas connection is made with the welding fixture and with the workpiece to ground either or both panel 50 or conduit 46, and a flow of inert gas through holes 144 and 146 may precede the actual flow of welding current whereby oxidation and other adverse effects on the workpiece components which might otherwise occur in the heated state are avoided. Flow of the inerting gas is continuously maintained throughout the welding operation. Since the inerting agent may be at a relatively low temperature, the stated procedure provides the additional advantage of cooling the workpiece components in the areas thereof adjacent to the location where welding heat is applied, thus helping to avoid annealing of the workpiece material. Welding is accomplished by electrode 140 by application of electrical power thereto during simultaneous rotation of welding ring 112 by suitable external means such as a constant speed electric motor operating through a flexible cable (not shown) connected to drive shaft 136. Following completion of the welding operation, throughbolts 158, 160, 166 and 168 may be loosened and housing 80 may be separated from around the workpiece components after which welding ring 112 may be simularly separated and removed.

While fabrication of the joint shown in FIGURES 3 and 6 has been illustratively described only in connection with structure shown in FIGURES 5, 6 and 7, it will be understood by those skilled in the art that a generally similar joint could also be fabricated by a burn-through weld of the type shown, for example, in FIGURE 4 using the welding apparatus disclosed in aforementioned copending U.S. Patent No. 3,194,936.

From the description of structure and its operation as set forth above and shown in the drawings, it may be seen that the invention disclosed herein provides novel means for applying heat such as required for welding operations in relatively remote and inaccessible areas. The welding apparatus shown in FIGURES 5, 6 and 7 has been found extremely efficient and compact, and is readily adaptable for welding a variety of different workpiece shapes and sizes, such as elbows, T's, crosses, reducers and the like involving simultaneous burn-down welding of two contacting flanges such as 30 and 36 shown in FIGURE 2a. The feature which permits separation of the welding apparatus along a common plane of separation and assembly thereof about an immovable and relatively inaccessible workpiece permits great versatility in use of the apparatus. The stated feature adapts the apparatus for in-place welding of fluid lines, tubes and conduits, thus avoiding the necessity for disassembly and removing portions of structure from an aircraft, missile or other vehicle interior as required for bench welding in a workshop. Thus, heat is concentrated at the precise location where welding is accomplished, and is contained within a small local area whereby other lines or structural elements situated close to the welding area are not affected by welding heat. Also, the novel conduit connection resulting from use of the apparatus disclosed herein in the stated manner has been found to possess superior strength with regard to transfer of loads between lightweight panels or bulkheads and tubes or conduits penetrating therethrough in the manner shown in FIGURE 3, for example. Thus, the location of the weld bead across distal edges 68 and 70 of flange portions 60 and 66 is sufficiently remote both from conduit 46 and panel 50 so that welding heat applied to fuse together the two stated flanges does not result in degradation of material strength either in the panel or the conduit. Moreover, the novel arrangement of parts in the fittings shown by FIGURES 3 and 4, for example, whereby the flange portions on the ferrule and on the panel insert or bushing extend coaxially about the center axis through both fitting components, results in less overall size and permits removability of the weld bead where burn-down welding is used to join the stated components. Thus, for example, removal of weld bead 71 in FIGURE 3 would permit separation of conduit 46 from panel 50 for any reason, after which the same or another ferrule similar to ferrule 42, with a conduit attached thereto, could be placed in the relationship shown by FIGURE 3 and again welded in place by another weld bead of the form illustrated by bead 71. If flange portions 60 and 66, for example, are made of sufficient length, removal and reinstallation of fitting components may be done many times before insufficient base metal remains to perform any further burn-down welding of the stated flanges. Finally, use of individual components such as ferrule 42 and ring 58 preplaced upon the workpiece components before their in-place joinder to form the novel fitting shown in FIGURE 3, for example, permits leak testing of the individual fitting components after their joinder to workpiece components and before their final installation in an aerial vehicle or missile.

While the particular details set forth above and in the drawings are fully capable of attaining the objects and providing the advantages herein stated, the structure and method thus disclosed are merely illustrative and could be varied or modified to produce the same results without departing from the scope of the inventive concept as defined in the appended claims.

We claim:

1. The method of joining together an elongate first member of tubular form and a second member of panel-like form having two spaced-apart confronting walls penetrated by said first member, said method comprising the steps of:
    attaching to the outer surface of said first member intermediate the ends thereof a collar having a substantially cylindrical annular flange extending coaxially about said first member and in spaced relationship with said outer surface,
    providing an aperture through each of said walls of said second member, said apertures being in substantial alignment permitting passage of said first member therethrough,
    attaching a hollow ring to said second member with said hollow ring substantially axially aligned with said apertures, said hollow ring having an annular substantially cylindrical flange extending outwardly from one of said walls and coaxially with respect to said apertures,
    aligning said annular flanges on said collar and said ring with each other, so that said flanges are in substantially uniform circumferential surface area contact and said first member extends through said ring and said apertures, and thereafter
    forming a joint between said annular flanges on said collar and said ring.

2. The method set forth in claim 1 above wherein said joint is formed by applying welding heat to fuse together said two annular flanges.

3. The method set forth in claim 1 above wherein said joint is formed by brazing said annular flanges to each other.

4. The method as set forth in claim 1 above wherein said collar is attached to said first member by welding.

5. The method set forth in claim 1 above wherein said collar is attached to said first member by brazing.

6. The method set forth in claim 1 above wherein said joint is formed by application of welding heat to the distal edges of said two annular flanges on said collar and said ring simultaneously.

References Cited
UNITED STATES PATENTS

| | | | |
|---|---|---|---|
| 1,781,848 | 11/1930 | Kelly | 285—280 X |
| 2,185,450 | 1/1940 | Wager | 285—158 |
| 2,198,535 | 4/1940 | James | 285—158 X |
| 2,388,177 | 10/1945 | Patterson et al. | 285—158 X |
| 3,149,295 | 9/1964 | Grebe | 285—286 X |
| 3,240,514 | 3/1966 | Bell | 285—158 |
| 2,792,241 | 5/1957 | Bondley | 285—286 |
| 2,878,040 | 3/1959 | Hobbs | 285—286 |
| 2,209,975 | 8/1940 | Jacobus | 29—157.4 |
| 3,078,551 | 2/1963 | Patriarca | 29—157.4 |
| 2,818,493 | 12/1957 | Pilia | 219—125 |
| 2,324,928 | 7/1948 | Hill | 285—286 |
| 2,349,792 | 5/1944 | Rosenbald | 285—286 |
| 2,447,259 | 8/1948 | Lucke | 285—286 |

JOHN F. CAMPBELL, *Primary Examiner.*

THOMAS F. CALLAGHAN, *Examiner.*

J. D. HOBART, S. R. MILLER, *Assistant Examiners.*